PATENTED FEB 2 1971 3,559,759

AIR CUSHION VEHICLES HAVING INCREASED ROLL STIFFNESS

The present invention relates to vehicles and more particularly to vehicles supported and/or guided by cushions of fluid under pressure.

The irregularities of the surface over which the vehicle is travelling and pressures of aerodynamic origin including side winds may produce rolling, pitching and oscillating movements.

Rolling movements are particularly liable to be produced and a problem exists in increasing the roll stiffness of the vehicle without affecting its heave stiffness.

It is obviously undesirable to increase the heave stiffness and it is equally desirable to increase the roll stiffness.

An object of the invention is to provide a vehicle adapted to be supported and/or guided by cushions of fluid under pressure which includes a device for increasing the roll stiffness of the vehicle, without affecting the heave stiffness of the vehicle.

This may be achieved mechanically or by fluid devices. The pads may be interconnected mechanically or the supply of cushion air may be varied in accordance with the pressure below the pads.

In accordance with one aspect of the invention there is a mechanical interconnection between a pair of cushions or pads on opposite sides of the vehicle such that as the vehicle rolls to one side the pad on the other side is automatically lifted up so that the vehicle tends to roll back towards its initial position.

Mechanical connection may, for example, take the form of an arm pivoted to each pad and connected by a pivotal connection to a fixed part of the vehicle, the two arms being interconnected by gearing such as toothed quadrants.

Alternatively, the pads may be connected to the body through a parallel linkage, the linkage being so arranged that upward movement of one pad causes upward movement of the opposite pad of the pair of pads.

Another alternative involves connecting the pads to the vehicle through cross links, the links being interconnected where they cross in a manner which allows for relative sliding movement between the links but which ensures that as one pad moves upwardly the opposite pad of a pair is moved upwardly. The connection between the two links may, for example, be by means of a pin and slot mechanism. In another alternative the pads are connected through a linkage to opposite ends of the arms of a torsion bar, the torsion bar being journaled in a fixed part of a vehicle.

To achieve a similar effect by pneumatic or hydraulic coupling devices the pads may, for example, be supported through the medium of pistons, each piston supporting one pad and each piston being contained in a cylinder in which there is pneumatic or hydraulic fluid. The portion of one cylinder below the piston may be connected to the portion of the other cylinder above its piston, the remaining portions of the two cylinders also being cross connected so that if one piston is forced upwardly by the roll of the vehicle the other piston would be forced upwardly, producing a force compensating the roll.

In another form of pneumatic coupling the main flow of air to each pad or cushion is supplemented by a stabilizing flow of air, the proportion of the stabilizing flow of air which flows to each pad cushion being determined by applying cushion pressure from each pad as a deflecting signal to deflect the stabilizing flow to the other pad or cushion.

The control of the flow of air need not be achieved by applying cushion pressure directly as a deflecting signal. Instead the cushion pressure may be used merely to operate a servosystem controlling a higher pressure source, the high pressure being used to deflect the main supply of air to one cushion or another.

In each instance there is preferably a coil or other spring connecting each pad to the fixed body of the craft.

Figure 8:
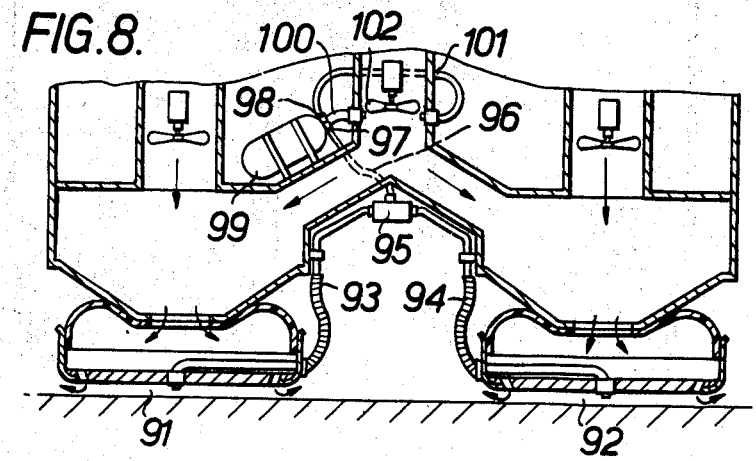
Figure 9:
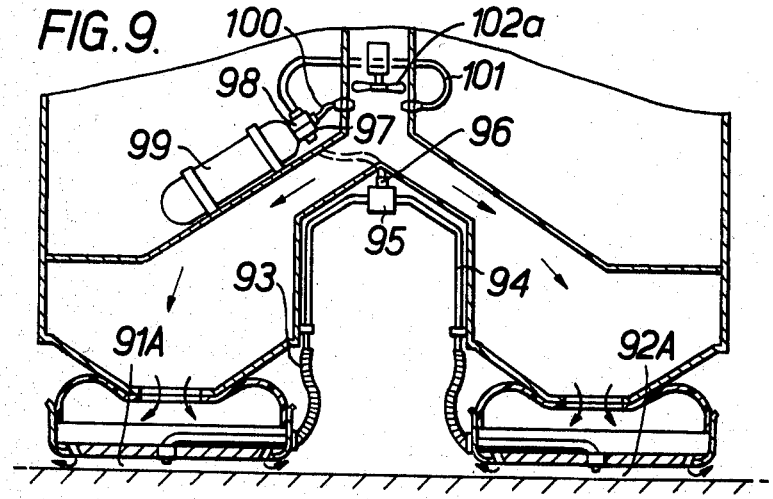

FIG. 8 shows a pneumatic arrangement in which the cushion pressure is used as a signal to operate a servo system to control a supply of high pressure air for use in deflecting the stabilizing flow; and FIG. 9 shows a simpler variation of FIG. 8 in which there is only one source of compressed air and it is this compressed air which is deflected by a high pressure controlled by a servo system in turn controlled in accordance with cushion pressure as in FIG. 8.

Figure 1:
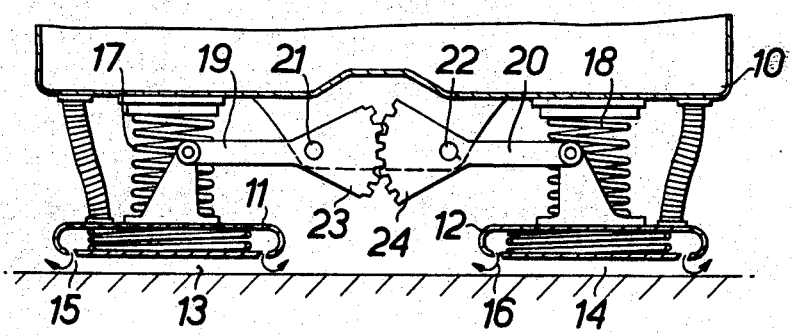
FIG. 1 is a transverse vertical section through part of a gas cushion vehicle which may, for example, be a tracked vehicle in which two air cushion pads are interconnected by pivoted arms in turn joined by toothed quadrants.

In FIG. 1 is shown the body 10 of a gas cushion vehicle which may be of the type used for transport across land and water or for operation on a prepared track. Below the body 10 are a pair of pads 11 and 12, which, in known manner, provide for air cushions 13 and 14 contained by curtains 15 and 16 respectively. The pads 11 and 12 are each connected to the body 10 through the medium of springs 17 and 18 respectively and are also supported by pivoted arms 19 and 20. The arms 19 and 20 are pivoted at 21 and 22 respectively to the body of the vehicle and they carry toothed quadrants 23 and 24 which intermesh as shown.

As the vehicle rolls to one side the pad on that side will tend to move closer to the body 10 which will cause rotation of the arm 20 about the pivot point 22 and this in turn will cause rotation of the arm 19 in the opposite direction about pivot point 21 so as to lift the pad 11 relatively to the ground. Lifting of the pad 11 reduces the cushion pressure below the pad and so the vehicle tends to roll back into its original position.

Figure 2:
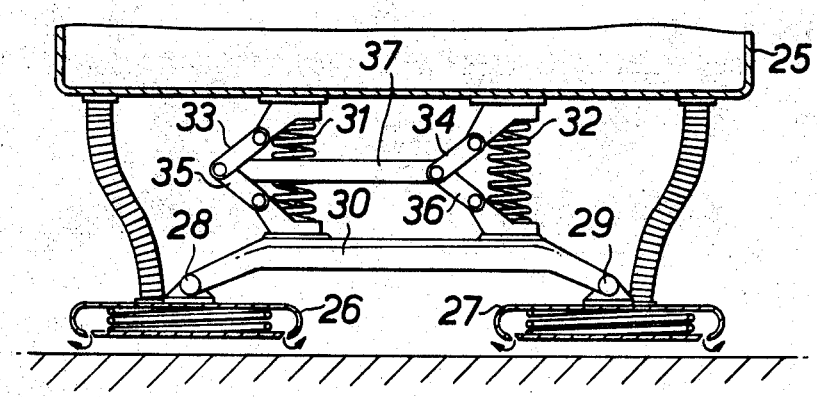
FIG. 2 shows an arrangement in which the pads are interconnected by a parallel linkage.

In the arrangement shown in FIG. 2 the body of the vehicle 25 is supported by similar cushion pads 26 and 27, but in this instance the two pads 26 and 27 are pivoted at 28 and 29 to a beam 30. The beam 30 is connected to the body 25 of the vehicle through the medium of coil springs 31 and 32 and also through parallel linkages 33, 34, 35 and 36 respectively. The junction of the links 33 and 35 is connected to one end of an arm 37 to the other end of which is connected the junction of arms 36 and 34.

It will be seen that if the vehicle rolls in a clockwise direction, as seen in FIG. 2, the body 25 will tend to get closer to the pad 27 and this will cause a scissorlike action of the pairs of links 34, 36 and 33, 35 which will in turn lift the pad 26 relatively to the ground. This will result in a counterclockwise movement of the vehicle body to correct the roll.

Figure 3:
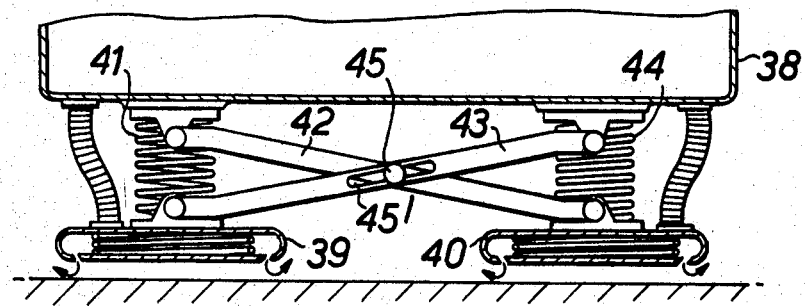
FIG. 3 shows an arrangement in which the pads are interconnected by cross links.
Figure 4:
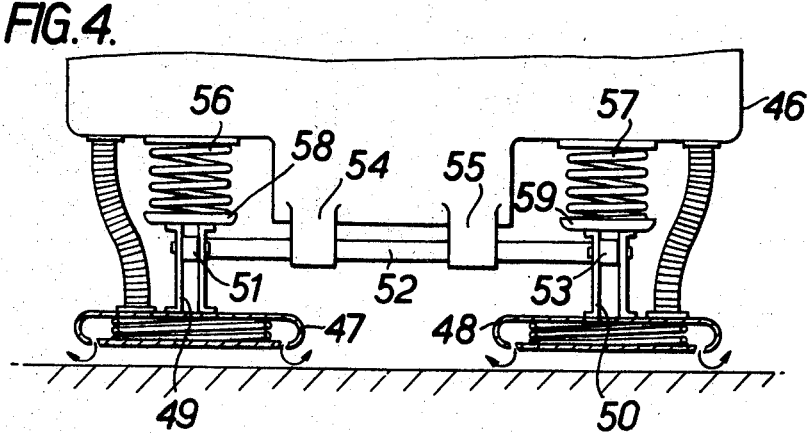
FIG. 4 shows an arrangement in which the pads are interconnected by a torsion bar.
Figure 5:
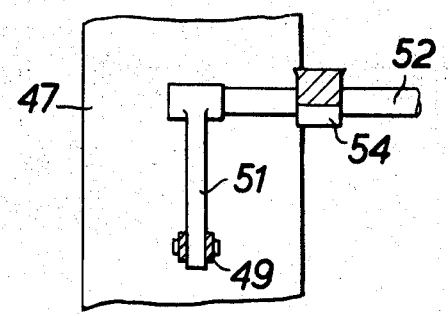
FIG. 5 shows a detail of the torsion bar arrangement shown fully in FIG. 4.
Figure 6:
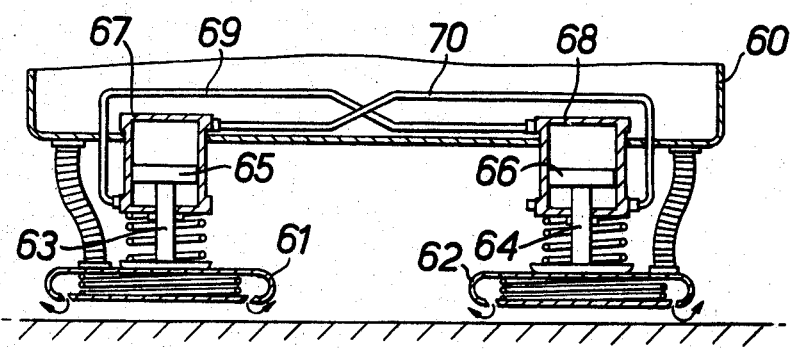
FIG. 6 shows a vehicle supported on cushion pads the cushion pads being carried by pistons located in fluid-containing cylinders.
Figure 7:
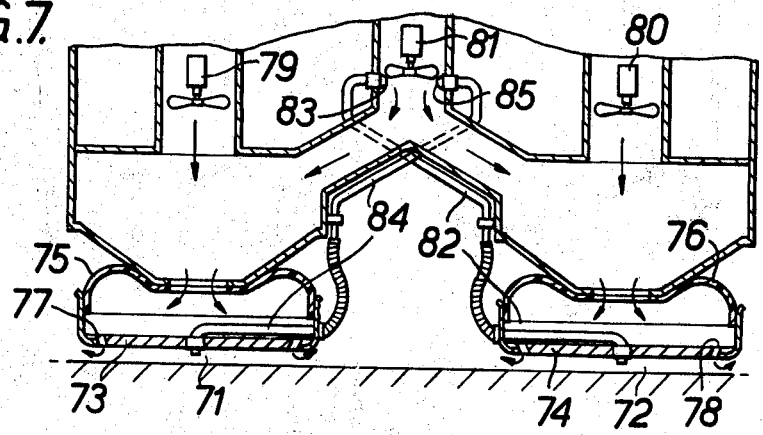
FIG. 7 shows a pneumatic arrangement in which there is a stabilizing flow deflected to one or other of the cushions by the opposite cushion's pressure.

In FIG. 3 the body 38 is supported on pads 39 and 40 below which are the usual cushions. Pad 39 is connected to the body by a spring 41 and also by a cross link 43. Pad 40 is connected to the body 38 by a coil spring 44 and a cross link 42. Adjacent their center points the two cross links 42 and 43 are interconnected by a pin 45 and slot 45 which allows relative sliding movement of the cross links but prevents relative vertical movement of the centers of the cross links.

Again the cross links act with a scissorlike action to ensure that as the vehicle rolls in one direction the pad on the opposite side of the vehicle lifts which tends to counteract the roll.

United States Patent

[11] 3,559,760

| [72] | Inventor | Jack S. Ninomiya |
| | | Rockwood, Mich. |
| [21] | Appl. No | 016,162 |
| [22] | Filed | Mar. 3, 1970 |
| [45] | Patented | Feb. 2, 1971 |
| [73] | Assignee | Ford Motor Company |
| | | Dearborn, Mich. |
| | | a corporation of Delaware |

[54] VEHICLE MUFFLER AND PARTICLE SEPARATOR
9 Claims, 2 Drawing Figs.

[52] U.S. Cl............................................. 181/36,
181/53, 181/69, 181/56; 55/276
[51] Int. Cl............................................. F01n 1/08,
F01n 3/02
[50] Field of Search............................................. 181/36.3,
68, 69, 56, 46, 36, 53; 55/276

[56] References Cited
UNITED STATES PATENTS

| 3,092,206 | 6/1963 | Moreau...................... | 181/68 |
| 3,154,174 | 10/1964 | Haining...................... | 181/56X |
| 3,170,280 | 2/1965 | Rees.......................... | 181/36(.3) |
| 3,187,834 | 6/1965 | Bryson et al............... | 181/56X |

*Primary Examiner*—Robert S. Ward, Jr.
*Attorneys*—John R. Faulkner and Glenn S. Arendsen

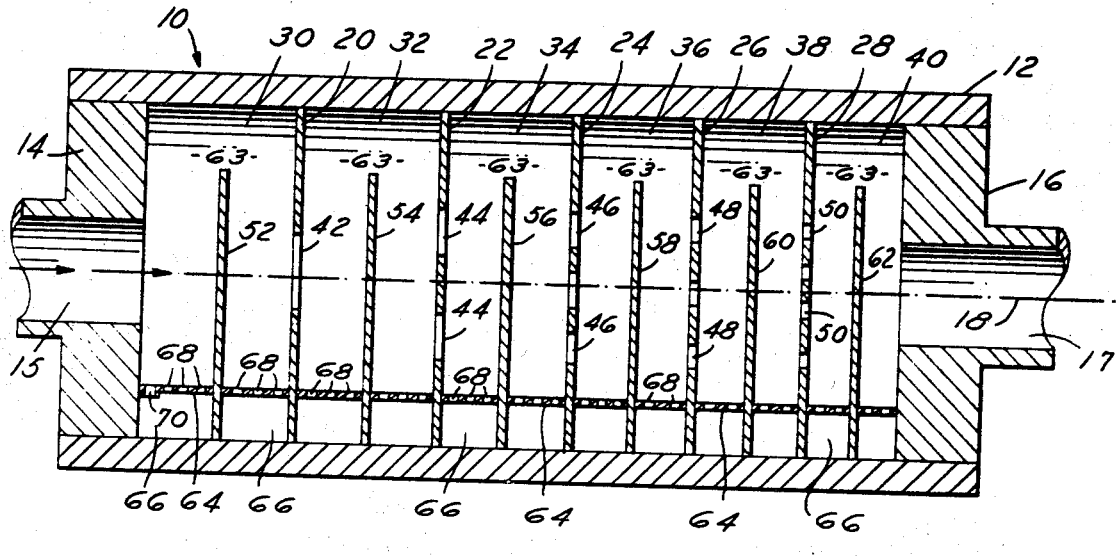

ABSTRACT: Engine exhaust gases enter a series of chambers through succeeding partitions containing orifices of decreasing size but increasing numbers. A baffle is located in each chamber downstream of its inlet orifices to change the flow direction of the exhaust gases in such a manner that particulate matter carried by the exhaust gases drops to the bottom of the chamber. The bottom of each chamber contains a false floor having openings therein and the particulate matter drops through the openings into storage compartments.